US007072246B2

(12) United States Patent
Lizzi

(10) Patent No.: US 7,072,246 B2
(45) Date of Patent: Jul. 4, 2006

(54) WEARABLE ELECTRONIC DEVICE WITH MULTIPLE RING INDICIA DISPLAY

(75) Inventor: Ronald S. Lizzi, Bethany, CT (US)

(73) Assignee: Timex Group B.V. (NL)

( * ) Notice: Subject to any disclaimer, the term of this patent is extended or adjusted under 35 U.S.C. 154(b) by 0 days.

(21) Appl. No.: 11/141,973

(22) Filed: May 31, 2005

(65) Prior Publication Data

US 2005/0219960 A1 Oct. 6, 2005

Related U.S. Application Data

(63) Continuation-in-part of application No. 10/441,417, filed on May 20, 2003.

(51) Int. Cl.
*G04B 47/00* (2006.01)
*G04B 47/06* (2006.01)
*G04B 19/04* (2006.01)
*G01D 13/10* (2006.01)

(52) U.S. Cl. ........................... 368/10; 368/11; 368/80; 368/223; 368/228; 116/292; 116/308

(58) Field of Classification Search .................. 368/10, 368/11, 80, 223, 228; 116/284, 290, 292
See application file for complete search history.

(56) References Cited

U.S. PATENT DOCUMENTS

| | | | | |
|---|---|---|---|---|
| 4,547,077 | A * | 10/1985 | Arichi et al. | 368/107 |
| 4,823,329 | A * | 4/1989 | Schwer et al. | 368/107 |
| 4,974,217 | A * | 11/1990 | Inoue | 368/108 |
| 5,224,059 | A | 6/1993 | Nitta et al. | |
| 5,245,944 | A * | 9/1993 | Yamamoto | 116/334 |
| 5,802,016 | A | 9/1998 | Kubota et al. | |
| 6,275,450 | B1 * | 8/2001 | Makiba | 368/80 |

* cited by examiner

*Primary Examiner*—Vit W. Miska
(74) *Attorney, Agent, or Firm*—Carmody & Torrance LLP

(57) ABSTRACT

A wearable electronic device for conveying information in an analog manner at least in part by the use of at least one display hand positioned on the dial side of a dial, and a rotatable ring positioned on the opposite side of the dial, wherein the wearable electronic device uses the coordination of the display hand(s) and the ring to convey information that is stored in the controller of the device and/or provided by sensors and/or an external transmitter. An actuation mechanism, preferably a stepper motor, is used to rotate the display hand and ring in the clockwise and/or counterclockwise directions in predefined increments to convey the information. In the preferred embodiment, the wearable multimode electronic device is a wristwatch.

13 Claims, 4 Drawing Sheets

WEARABLE ELECTRONIC DEVICE WITH MULTIPLE RING INDICIA DISPLAY

CROSS REFERENCE TO RELATED APPLICATION

This application is a continuation-in-part of copending application Ser. No. 10/441,417, filed on May 20, 2003, the subject matter of which is incorporated by reference as if fully set forth herein.

BACKGROUND OF THE INVENTION

This invention relates generally to wearable electronic devices, such as timepieces, and in particular, to an electronic device, such as for example and not limitation, a watch, that has multiple display capabilities. More specifically, the electronic device of the present invention incorporates a rotatable ring for displaying changeable informational indicia. When provided in combination with a coordinatingly rotatable display hand, an advantageous and more versatile "analog type" display in an electronic device is provided.

Display hands that "point" to indicia on the dial of a device, such as a watch, whether it be the day, a number (i.e. to tell time or elapsed time, etc.) or pressure indicia (e.g. see U.S. Pat. No. 5,02,016) are known. Rotating rings, positioned under the dial, are also well known and used to display such things as the date (e.g. "1"–"31").

However, further advancements in the art are believed to be achievable. In particular, it would be desirable to provide a rotatable ring that has thereon indicia relating to one or more modes (and/or a single mode utilizing more than one scale, as more fully disclosed below) in order to provide an electronic device that displays information with the use of hands (i.e. in an "analog manner"), thus having increased display functionality.

It is believed that the functionality to provide the foregoing advantages and achieve the objectives set forth below are provided by the present invention.

SUMMARY AND OBJECTIVES OF THE INVENTION

It is thus an objective of the present invention to overcome the perceived deficiencies in the prior art.

It is yet another objective and advantage of the present invention to provide an electronic device that has increased display capabilities using for example, display hands and one or more display windows with a rotatable ring being positioned thereunder.

It is still another objective and advantage of the present invention to provide an electronic device that has increased display capabilities using a minimum number of display hands yet still obtaining increased display functionality.

It is yet another objective of the present invention to provide an electronic device of the type disclosed herein that can be utilized with all the features and components disclosed in application Ser. No. 10/441,417.

Further objects and advantages of this invention will become more apparent from a consideration of the drawings and ensuing description.

The invention accordingly comprises the features of construction, combination of elements and arrangement of parts that will be exemplified in the disclosure hereinafter set forth, and the scope of the invention will be indicated in the claims.

To overcome the perceived deficiencies in the prior art and to achieve the objects and advantages set forth above and below, the present invention is, generally speaking, directed to wearable electronic devices, such as electronic timepieces and watches in particular.

In a preferred embodiment, the wearable multimode electronic device of the type wherein information is conveyed in an analog manner at least in part by the use of at least one display hand, wherein the wearable electronic device includes a dial having a dial side and an opposite side, wherein the dial has at least one window, and the display hand is positioned on the dial side of the dial, wherein the wearable multimode electronic device comprises a first actuation mechanism, operatively coupled to the at least one display hand, for rotating the at least one display hand in at least one of a clockwise and counterclockwise direction; a ring, positioned on the opposite side of the dial and operatively coupled to a second actuation mechanism that rotates the ring in at least one of a clockwise and counterclockwise direction, wherein the ring has provided thereon informational indicia; a controller, operably coupled to both the first and second actuation mechanisms, for causing the first actuation mechanism to rotate the at least one display hand in at least one of the clockwise and counterclockwise direction, and causing the second actuation mechanism to rotate the ring in at least one of the clockwise and counterclockwise directions; wherein at least a portion of the ring is viewable through the at least one window such that informational indicia corresponding to the mode or scale which the electronic device is operating is visible in the at least one window, and wherein the rotation of the ring changes the informational indicia that is visible in the at least one window; and wherein the positioning of the display hand as it rotates in the one of the clockwise and counterclockwise directions over the window conveys the information by referring to particular informational indicia, and wherein the controller operatively controls the positioning of the hand so that the hand can convey the information in the analog manner.

In the preferred embodiment, the wearable multimode electronic device is a wristwatch.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DESCRIPTION OF THE PREFERRED EMBODIMENTS

Figure 1:
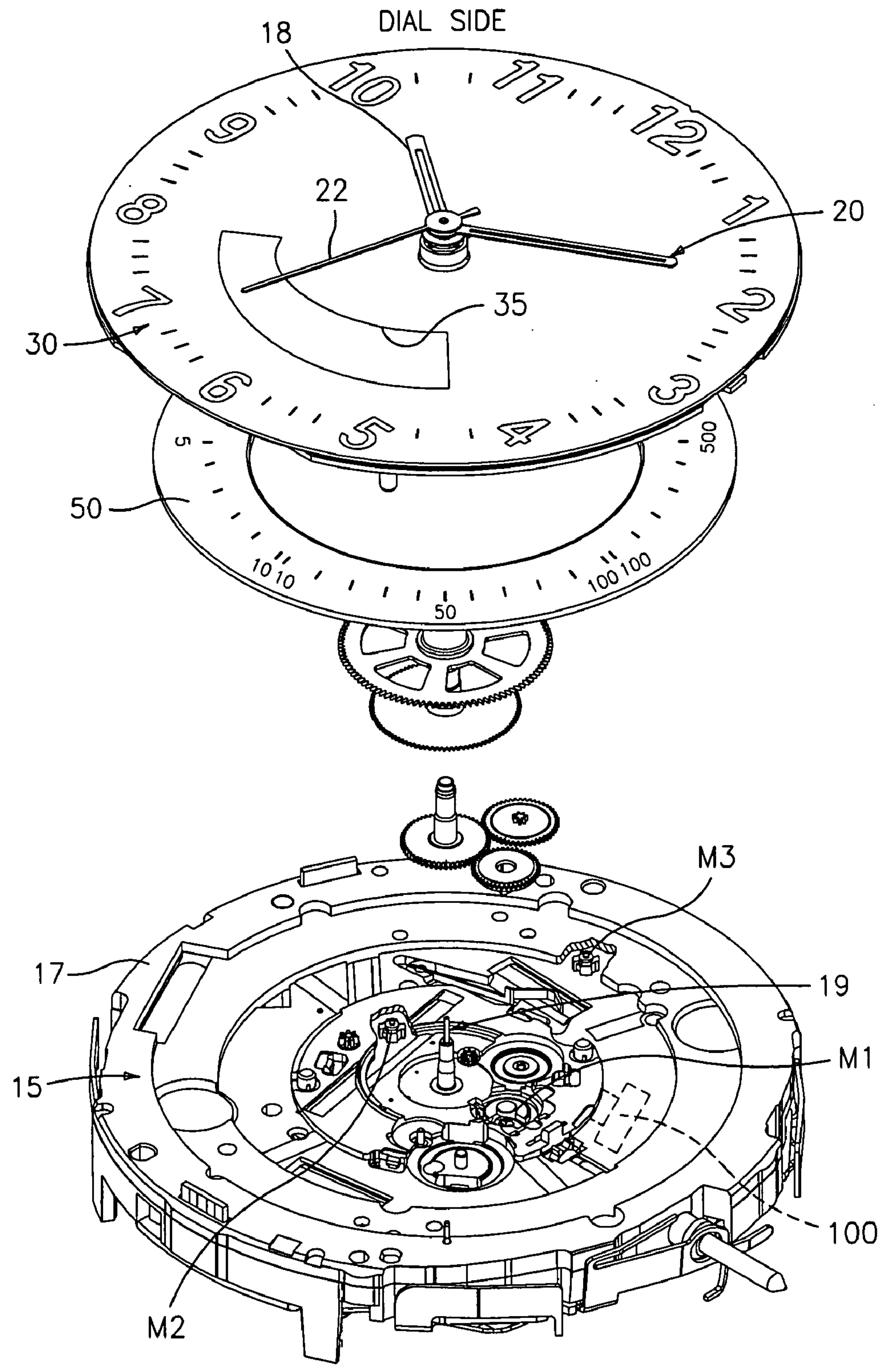
FIG. 1 is an exploded view of an electronic device constructed in accordance with the present invention.

Reference is first made generally to FIG. 1, which illustrates an exploded view of an electronic device, generally indicated at 10, constructed in accordance with the present invention. In the preferred construction, electronic device 10 is a timepiece, such as a wristwatch, which itself will thus comprise other features and parts, namely for example and not limitation, a wrist strap (not shown) for securing electronic device 10 to a wrist. Non-essential details of the present invention can be found in the aforementioned coowned and copending U.S. application Ser. No. 10/441,417, which is fully incorporated by reference herein. Preferably, electronic device 10 is wearable on or about the body.

Generally speaking, electronic device 10 comprises a module, generally indicated at 15, which itself includes a housing 17, in which are disposed many components, the material ones of which pertain to the present invention being hereinafter disclosed. However, it should be understood that the present disclosure will omit, for purposes of brevity, certain basic and very well known concepts regarding the construction of an analog watch, such as for example, the basic construction and arrangements of gears and/or gear trains to rotate a plurality of "standard" hands, such as an hour hand 18 and a minute hand 20, as being well within the purview of one skilled in the art.

As illustrated in FIG. 1, electronic device 10 comprises a dial, generally indicated at 30, made of Mylar or another suitable plastic. Dial 30 preferably comprises at least one window 35, along with having thereon numerals, such as 1–12 corresponding to "hour" designations, printed, silk-screened or otherwise formed thereon. Other indicia to assist in telling time may also be provided on dial 30.

In accordance with the present invention, electronic device 10 comprises one or more "display hands" aside from the conventional hour and minute hand. For example, FIG. 1 illustrates a hand 22 also mounted on center stem 19.

In the embodiment illustrated in FIG. 1, electronic device will comprise three (3) stepper motors, each respectively and generally indicated as M1, M2 and M3 and disposed in module 15. Their specific location is one of design choice and dictated by constraints such as spacing and torque requirements. One skilled in the art would recognize that varying the number of displays and display hands can vary the number of needed stepper motors, all of which is within the scope of the present invention and disclosure.

As positioned in module 15, motor M1 is provided to rotate hour hand 18 and minute hand 20 in a known manner. Specifically, hour hand 18 and minute hand 20 are coupled to a gear train for conveying the rotational activity generated by the rotor of motor M1. In a similar manner, hand 22 is rotated by stepper motor M2 and another gear train is provided to convey the rotational activity generated by the rotor of motor M2 to hand 22. The construction of the respective gear trains are well within the purview of one ordinarily skilled in the art, and again, reference may be made to the aforementioned '417 application for details thereof. In the preferred embodiment, motor M2 is a bi-directional stepper motor thus being able to rotate in either direction, and the construction of acceptable stepper motors to functionally operate in this manner are widely available and well within the understanding of those skilled in the art. Motor M1 need not be bi-directional as would be known to one skilled in the art. It is also well within the skill of the designer to design an appropriate gearing ratio to provide for the desirable display rotation or movement of display hand 22. That is, it may be desirable for the incremental rotation of hand 22 to be quite small, thus providing for precise increments and display measurements, again all of which is disclosed in the '417 application if not already known to the ordinarily skilled artisan.

Figure 2:
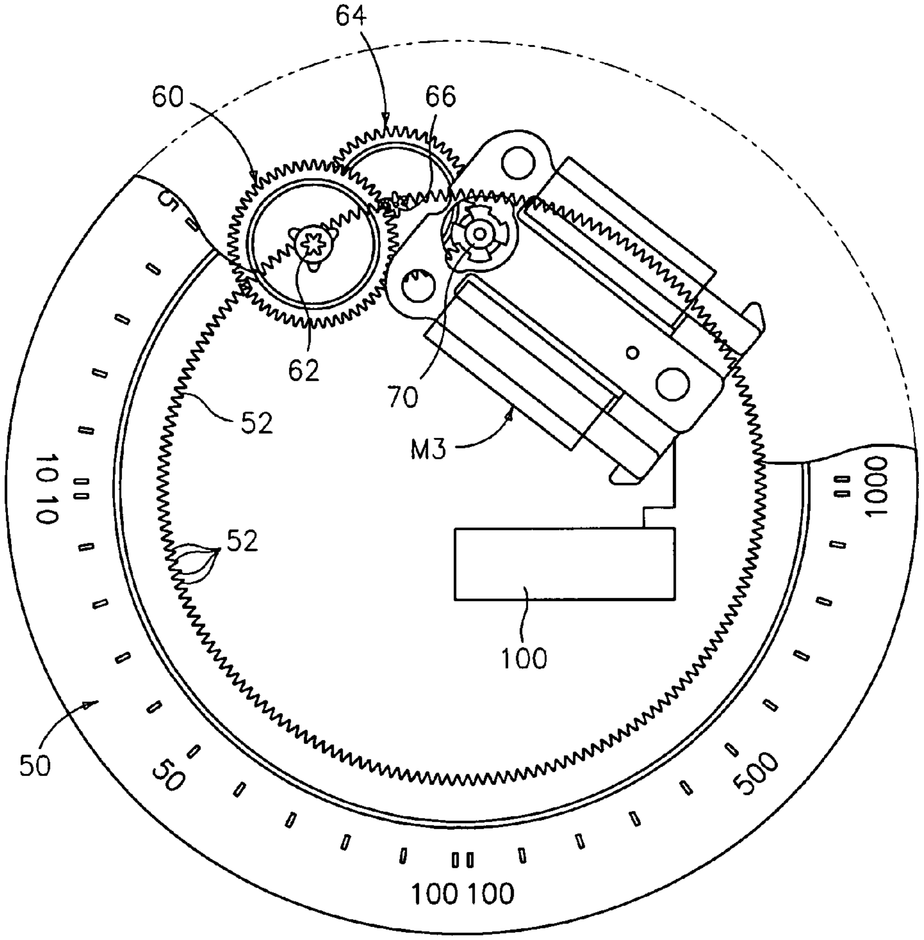
FIG. 2 is a top plan view of a ring, associated gear assembly and an actuation mechanism, all of which are constructed in accordance with the present invention.

FIG. 1 also illustrates dial 30 comprising a ring 50, positioned on the opposite side of dial 30, a portion of which is visible through window 35. Reference is also made to FIG. 2 for a more detailed disclosure of ring 50 and its associated actuation mechanism and gear assembly.

Specifically, ring 50 is operatively coupled to an actuation mechanism, generally indicated at M3, that rotates ring 50 in at least one of a clockwise and counterclockwise direction. In the preferred embodiment, actuation mechanism M3 is a stepping motor (and preferably, but not necessarily, a bi-directional stepping motor). A gear assembly operatively couples motor M3 to ring 50. In the preferred embodiment, the gear assembly comprises a wheel 60 on which is a pinion 62, which is coupled to ring 50 via teeth on pinion 62 being in meshing alignment with teeth 52 of ring 50. The gearing assembly may also include an intermediate wheel 64, which itself also includes a pinion 66 that is in meshing alignment with the outer teeth of wheel 60. In this way, the rotation of the one or more wheels (e.g. wheel 60 and wheel 64) causes the rotation of ring 50. Stepping motor M3 comprises a rotor 70, which in the preferred embodiment, is rotatably coupled to one of the wheels of the gearing assembly (i.e. wheel 64). That is, rotor 70 will preferably comprise teeth that meshingly align with the outer teeth on wheel 64. The selection of a suitable stepping motor and the arrangement and/or positioning of the components are all within the purview of one skilled in the art. Of course, it should be understood that the number of wheels included in the gearing assembly may be more or less than that disclosed herein, and are really one of design choice for the intended function and based upon a number of known criterions, such as power and torque constraints.

The illustrated arrangement of stepping motor M3 and the associated gearing assembly is but only one example, as one skilled in the art could easily, as a matter of design choice, arrange the components differently yet achieve the functional equivalency. For example, the gears may be arranged to engage and meshingly rotate ring 50 on its outer circumference instead of on its inner circumference as illustrated. Also, the particular position of motor M3 or its alignment may change and may only be a function of packaging constraints in module 15. Again, none of the foregoing changes materially affects the function of the present invention.

As best illustrated in FIG. 2, ring 50 has informational indicia thereon. The indicia may be printed, silk-screened or otherwise formed thereon. In accordance with the present invention, the informational indicia may correspond to one or more scales that are related to a single mode and/or correspond to one or more modes. Each example is discussed in turn.

For example, ring 50 as illustrated in FIG. 2 is provided with information indicia corresponding to scales 1–10, 10–100, 100–1000 (with the fourth scale not visible for purposes of brevity). In such an example, it is assumed that ring 50 has informational indicia corresponding to a single mode (e.g. altitude, water depth) with varying scales. That is, if the information indicia on ring 50 corresponds to altitude/depth, the visible scales in window 35 could be from 1–10 (e.g.) feet, 10–100 (e.g.) feet, 100–1000 (e.g.) feet and (not shown) 1000–10,000 (e.g.) feet. If device 10 is provided with an altitude/depth sensor (e.g. fully disclosed in the '417 application), as device 10 senses the appropriate altitude/depth change, ring 50 can rotate in one of a clockwise or counterclockwise direction to reflect the appropriate scale to be displayed. The utilization of display hand 22 in combination therewith will be discussed below.

In the second example, the informational indicia on ring 50 could correspond to more than one mode. For example, the information indicia indicated as 1–10 could relate to a lap counter, while the informational indicia indicating 10–100 may be temperature (obviously, the scale for temperature could be broadened (e.g. −10° to 100° C.) to encompass a more realistic/practical range). Likewise, the 100–1000 scale may be replaced with a 40–220 scale to represent heart rate, while yet the fourth scale (not shown) may have a scale indicative of blood pressure or the like. The importance being that the various scales (or other informational indicia) could all be unrelated if they correspond to different modes.

Additionally, there could be a mixture of the foregoing examples, e.g. there are two related scales corresponding to a single mode while the remaining two scales are unrelated (e.g. HR and blood pressure). Similarly, the informational indicia need not be in the form of a scale but could be other information (days of the week ("SUN," "MON," "TUE," "WED,") or compass headings ( "N" "W" "E" "S", if practical or desired) just to name a few).

A controller provides the proper and accurate controlling, positioning and rotation of ring 50. Details of the controller, generally indicated at 100, can likewise be found in the aforementioned '417 application with reference to controller 100 therein, and the controller of the present invention preferably comprises all of the functional features described therein to carry out the objectives and features of the present invention. The added functionality particular to the present invention shall now be disclosed.

Figure 3:
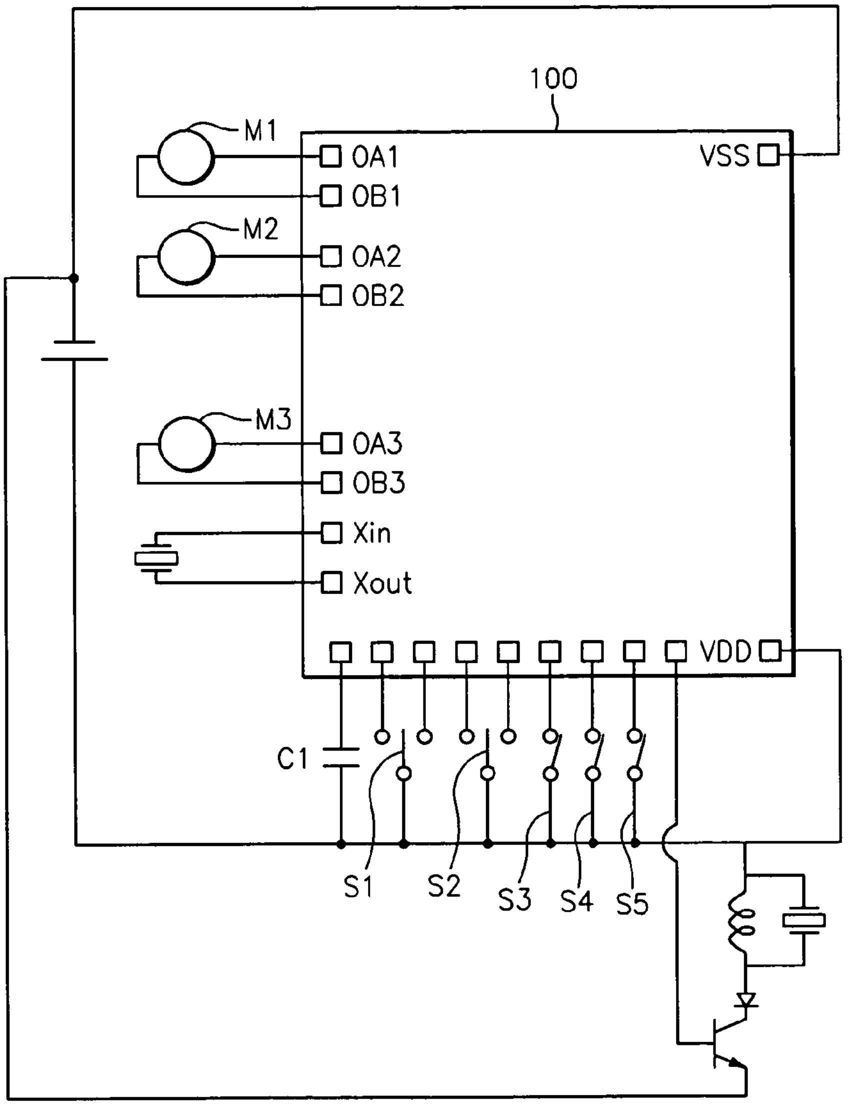
FIG. 3 is a circuit diagram for an electronic device constructed in accordance with the present invention.

General reference may be made to FIG. 3 for a block diagram of device 10, which illustrates among other things, interface connections to motors M1, M2 and M3 and switches S1–S5. Switches S1–S5 are intended to generically indicate both side/top mounted pushers, as well as side mounted rotatable crowns, and thus respond to the actuation (i.e. pulling and/or pushing) action thereof. In the case of crowns, the pulling and or pushing actuations may be provided for setting hands 18, 20 and/or calibrating, such as hand 22 and/or ring 50. A preferred hand 22 and ring 50 calibration methodology and arrangement is disclosed in the aforementioned '417 application and in copending and coowned application Ser. No. 10/737,406 the subject matter which is likewise incorporated by reference as if fully set forth herein. In this way, it is always possible to calibrate (i.e. initialize the position of) hand 22 and/or ring 50) so that controller 100 knows their respective positions.

Figure 4:
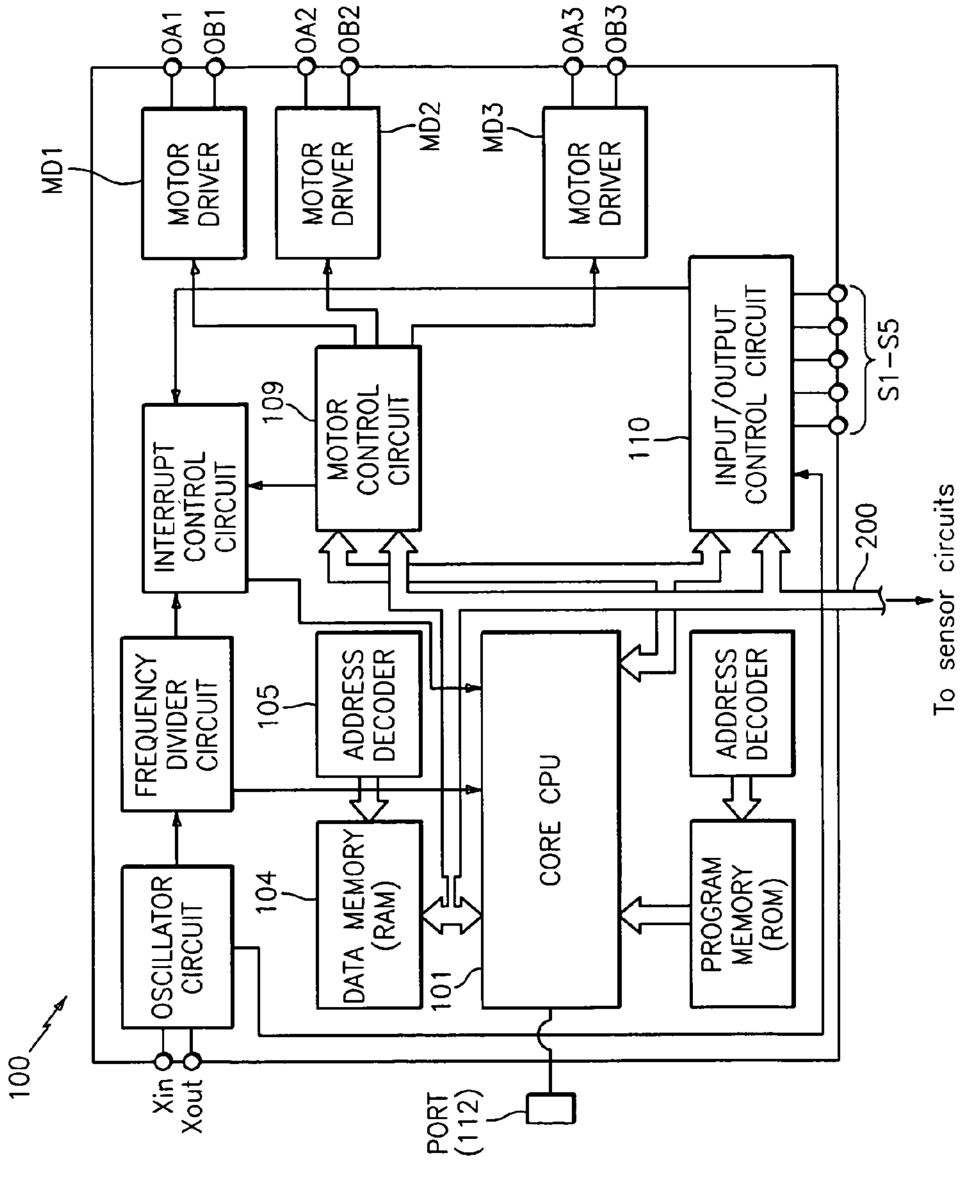
FIG. 4 is a block diagram of a controller, constructed in accordance with the present invention for use in an electronic device constructed in accordance with the present invention.

Reference may also be made to FIG. 4 which illustrates a block diagram of controller 100. Particular reference is made to motor control circuit 109, which receives a commanded "next number of pulses" from CPU core 101 and generates the pulsed and phased signals necessary to move a desired motor (M1, M2, M3) a desired amount and in a desired direction. Pulse outputs of motor control circuit 109 are buffered by motor drivers MD1, MD2, MD3 and applied to respective motors M1, M2, M3.

An input/output control circuit 110 controls the crown actuations and pushbutton switches of FIG. 3 and provides such signaling information to CPU 101. Specifically, manual actuation of one or more pushers may cause the rotation of the ring so that the proper mode/scale can easily be displayed in windows 35 of dial 30, thus allowing the user an ability to see the modes through which he/she is cycling. In a similar manner, the scales for a single mode can be manually varied as well using a pusher sequence (or depressed duration). Controller 100, knowing the mode and/or the scale appearing in the visible portion as well as the position of the rotors for motors M2 and/or M3, could coordinate the display of any mode or scale with the hand being properly positioned, especially using hand and the ring calibration set forth above and disclosed in the aforementioned '406 application.

Reference should be made to the '417 application for a more detailed description of the features and elements to interface electronic device 10 to "the outside world," as FIG. 4 shows a generic interface is illustrated for receiving signals from a parallel and/or serial sensor interface. By way of example and not limitation, some of the sensor circuits for measuring external parameters applicable in the present invention are ambient temperature, altitude and water depth, body temperature, heart rate, blood pressure and compass headings, just to name a few.

Although the preferred embodiment provides that controller 100 is highly integrated wherein all timing and display functionality is controlled in controller 100, alternate embodiments could separate the timekeeping functions from those processing and displaying stored or sensed data, as would be understood by one skilled in the art.

Whether using sensors (internal or external (e.g. a transmitter, such as a heartrate transmitter by way of example)) or stored data (such as that which is downloadable), known methodologies provide for the smooth display of information using display hand 22. For example, to determine the number of pulses and direction to move a rotor of a stepper motor to its next position it is necessary to know where the rotor is in terms of a number of pulses, subtract that from the new sensor (or stored) value converted to pulses, and based on the magnitude and sign of the difference, pulse the stepper motor the number of pulses needed to move the rotor the desired amount and in the desired direction. In an alternate embodiment the calculations above can be performed using converted sensor (or stored) values in digital format and then, by applying the appropriate scale factors, develop the number of pulse determined above.

Similar control of motor M3 permits the proper rotation of ring 50, wherein controller 100 will signal motor control circuit 109 to step the respective stepper motor a predetermined number of steps in a direction to change the informational indicia visible in window 35. Well known programming techniques along with the above methodology, allow controller 100 to determine whether and when to signal motor control circuit 109 to step the respective stepper motor so that a different scale or mode display can be visible through window 35.

Once the appropriate scale/mode is visible, the '417 application provides an excellent description of particular examples of moving hand 22 to accurately convey information using stored, sensed or transmitted data.

With a ring that can display various scales or mode informational indicia, a single electronic device can be manufactured with improved display functionality being selectively displayable on one display (and even in one window) and in one electronic device.

It will thus be seen that the present invention is both patentably different from and a significant improvement over known devices. Specifically, the present invention provides a unique way to clearly display, and makes easily comprehendible, information relating to external parameters, as well as time-based or nontime-based information that may be programmed into or otherwise stored in the timepiece. Additionally, the present invention can incorporate a wide range of sensor circuits and arrangements for measuring external parameters and have such measurements clearly and easily displayable. Moreover the particular use of a coordinated ring and display hand allows for easy and increased display functionality and also provides an aesthetically improved device.

While the invention has been particularly shown and described with respect to preferred embodiments thereof, it will be understood by those skilled in the art that changes in form and details may be made therein without departing from the scope and spirit of the invention. For example, in place of ring 50 and a mere elongated member may be used. Such an embodiment may require additional consideration as it relates to features to keep the member in place (e.g. springs, etc.) but such an embodiment is nevertheless covered hereby. Also, while ring 50 illustrates/discloses four (4) scales and/or modes, more or less than four (4) are certainly contemplated and covered hereby. Likewise, additional informational indicia may be provided on the ring/member so that the user can actually see, on the ring, what mode/scale (e.g. "heart rate" or altitude (ft)") he/she is actually in. Lastly, other externally transmitted information may be transmitted to device 10 and displayed, such as a fuel level in a gas tank or a credit card information as long as the scale on the ring is appropriately labeled.

Moreover, it should be understood that nothing herein (nor in the claims) requires that the entire indicia corresponding to the particular mode or scale be visible at any one time. For example, the present invention contemplates and covers an embodiment wherein the scale or other informational indicia relating to the mode is wider than the width of the display window, thereby permitting only a portion of the scale or mode to visible in the display window at any one time. In accordance with at least one example, such an embodiment may be desirable because of the display advantages created thereby.

For example, if the information indicia relates to a heartrate scale (e.g. 40–220), it may be advantageous if the scale is wider than the window thereby permitting larger indicia to be provided. Moreover, using the pushers (or other means for rotating the ring or elongated member (e.g. the controller in combination with memory that retains prior workout information)), the ring may be manually or automatically rotated in order to "center" a user's target/goal heartrate (e.g. at the 6 o'clock position). In this way, the user may be provided a way to make it easier and/or more convenient to see one's heartrate (e.g. or if the user is close to the target rate) by merely judging/assessing the angle of the hand (e.g. straight downward). Such an embodiment may be advantageous when, practically speaking, during a workout, the entire scale may not be useful (e.g. the user may never get to the high end (e.g. 220 bpm) and presumably would not be at the low end (e.g. 40 bpm) during exercise. To be sure, rotation of the ring or elongated member may be achieved by use of manual pushers, or the controller itself may store information based on prior workouts (and thus be able to rotate the ring/member as appropriate). In addition, because the controller can maintain information regarding the particular position of the ring or elongated member, any rotation (e.g. to display merely a different section of a scale) thereof can thus be taken into account (i.e. adjusted for) when coordinating the rotation and indications provided by display hand 22. For example, if the ring is rotated to "center" a specific target range or heartrate, it is ensured that the positioning/calibration of display hand 22 (via the controller) is adjusted so that rotation over the window indicates the correct indicia on the ring or elongated member. That is, the rotation of display hand 22 is adjusted by the particular indicia visible at any one time through the display window.

What is claimed is:

1. A wearable multimode electronic device of the type wherein information is conveyed in an analog manner at least in part by the use of at least one display hand, wherein the wearable electronic device includes a dial having a dial side and an opposite side, wherein the dial has at least one window, and the display hand is positioned on the dial side of the dial, wherein the wearable multimode electronic device comprises:

a first actuation mechanism, operatively coupled to the at least one display hand, for rotating the at least one display hand in at least one of a clockwise and counterclockwise direction;

a ring, positioned on the opposite side of the dial and operatively coupled to a second actuation mechanism that rotates the ring in at least one of a clockwise and counterclockwise direction, wherein the ring has provided thereon informational indicia;

a controller, operably coupled to both the first and second actuation mechanisms, for:

causing the first actuation mechanism to rotate the at least one display hand in at least one of the clockwise and counterclockwise direction, and causing the second actuation mechanism to rotate the ring in at least one of the clockwise and counterclockwise directions;

wherein at least a portion of the ring is viewable through the at least one window such that informational indicia corresponding to the mode or scale in which the electronic device is operating is visible in the at least one window, and wherein the rotation of the ring changes the informational indicia that is visible in the at least one window; and wherein the positioning of the display hand as it rotates in the one of the clockwise and counterclockwise directions over the window conveys the information by referring to particular informational indicia, and wherein the controller operatively controls the positioning of the hand so that the hand can convey the information in the analog manner.

2. The electronic device as claimed in claim 1, wherein the ring has provided thereon information indicia corresponding to at least a first mode and a second mode, wherein the informational indicia visible in the at least one window is based on the mode in which the wearable electronic device is operating.

3. The electronic device as claimed in claim 2, wherein the controller causes the second actuation mechanism to rotate the ring so that the informational indicia corresponding to the mode in which the wearable electronic device is operating is visible in the at least one window.

4. The electronic device as claimed in claim 1, wherein the ring has provided thereon information indicia corresponding to at least a first scale and a second scale both of which are related to a single mode, wherein the informational indicia visible in the at least one window is based on one of data stored in the controller or a sensed parameter.

5. The electronic device as claimed in claim 4, wherein the sensed parameter is sensed by an internally mounted sensor or transmitted to the device by an external transmitter.

6. The electronic device as claimed in claim 4, wherein the controller causes the second actuation mechanism to rotate the ring so that the informational indicia corresponding to the appropriate scale is visible in the at least one window.

7. The electronic device as claimed in claim 1, wherein each of the first and second actuation mechanisms comprise a stepper motor that itself comprises a rotor, the stepper motor operatively coupled to the controller, for stepping in at least one of a clockwise and counterclockwise direction in predefined increments.

8. The electronic device as claimed in claim 1, including manual actuation means to manually cause the rotation of the ring in one of the clockwise and counterclockwise direction.

9. The wearable multimode electronic device as claimed in claim 1, wherein only a portion of the informational indicia corresponding to the mode or scale is visible in the display window at any one time.

10. The wearable multimode electronic device as claimed in claim 1, wherein the wearable multimode electronic device is a wristwatch.

11. A wearable multimode electronic device of the type wherein information is conveyed in an analog manner at least in part by the use of at least one display hand, wherein the wearable electronic device includes a dial having a dial side and an opposite side, wherein the dial has at least one window, and the display hand is positioned on the dial side of the dial, wherein the wearable multimode electronic device comprises:

a first actuation mechanism, operatively coupled to the at least one display hand, for rotating the at least one display hand in at least one of a clockwise and counterclockwise direction;

an elongated member, positioned on the opposite side of the dial and operatively coupled to a second actuation mechanism that rotates the elongated member in at least one of a clockwise and counterclockwise direction, wherein the elongated member has provided thereon informational indicia;

a controller, operable coupled to both the first and second actuation mechanisms, for:

causing the first actuation mechanism to rotate the at least one display hand in at least one of the clockwise and counterclockwise direction, and causing the second actuation mechanism to rotate the elongated member in at least one of the clockwise and counterclockwise directions;

wherein at least a portion of the elongated member is viewable through the at least one window such that informational indicia corresponding to the mode or scale in which the electronic device is operating is visible in the at least one window, and wherein the rotation of the elongated member changes the informational indicia that is visible in the at least one window; and wherein the positioning of the display hand as it rotates in the one of the clockwise and counterclockwise directions over the window conveys the information by referring to particular informational indicia, and wherein the controller operatively controls the positioning of the hand so that the hand can convey the information in the analog manner.

12. The wearable multimode electronic device as claimed in claim 11, wherein only a portion of the informational indicia corresponding to the mode or scale is visible in the display window at any one time.

13. The wearable multimode electronic device as claimed in claim 11, wherein the wearable multimode electronic device is a wristwatch.

* * * * *